United States Patent
Kiannejad

(10) Patent No.: US 11,381,327 B2
(45) Date of Patent: *Jul. 5, 2022

(54) WIRELESS RADIO FREQUENCY INSTRUMENTATION AND ADAPTIVE NETWORK MANAGEMENT SYSTEM

(71) Applicant: SignalFox, Inc., Rio Rancho, NM (US)

(72) Inventor: Shervin Kiannejad, Brentwood, CA (US)

(73) Assignee: SignalFox, Inc., Rio Rancho, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,606

(22) Filed: Sep. 28, 2020

(65) Prior Publication Data

US 2021/0013976 A1 Jan. 14, 2021

Related U.S. Application Data

(63) Continuation of application No. 16/813,039, filed on Mar. 9, 2020, now abandoned, which is a continuation of application No. 16/036,934, filed on Jul. 16, 2018, now Pat. No. 10,587,352, which is a continuation of application No. 15/166,751, filed on May 27, 2016, now Pat. No. 10,027,429.

(60) Provisional application No. 62/168,566, filed on May 29, 2015.

(51) Int. Cl.
*H04B 17/318* (2015.01)
*H04W 24/04* (2009.01)
*H04W 24/08* (2009.01)

(52) U.S. Cl.
CPC .......... *H04B 17/318* (2015.01); *H04W 24/04* (2013.01); *H04W 24/08* (2013.01)

(58) Field of Classification Search
CPC ...... H04B 17/318; H04B 24/04; H04W 24/08
See application file for complete search history.

(56) References Cited

U.S. PATENT DOCUMENTS

| | | | |
|---|---|---|---|
| 7,020,701 B1 * | 3/2006 | Gelvin | G01D 21/00 250/332 |
| 10,587,352 B2 | 3/2020 | Kiannejad | |
| 2010/0124886 A1 * | 5/2010 | Fordham | H04B 17/382 455/67.11 |

(Continued)

*Primary Examiner* — Lewis G West
(74) *Attorney, Agent, or Firm* — Bekiares Eliezer LLP

(57) ABSTRACT

Proactive systems for monitoring, diagnosing, and providing a plan of corrective action for Radio Frequency (RF) hardware components as part of a greater system or network in telecommunications. The system can be used for remote sites and in conjunction with current network management tools as the most prolific and fundamental piece of instrumentation in telecommunication networks. The system can be used simply as an RF development instrument for any industry requiring the use of high frequency signals. It consists of four sensor modules that are wirelessly linked to a receiver module which could be miles away. The sensors are RF power detector, Spectrum Analyzer, Interference Cancelling Synthesizer, dual function RF power detector and spectrum analyzer. The data gathered allows the user to create a profile for specific malfunctions in the RF chain, as well as interference direction, strength and source type leading to remotely deployed solution, and a mobile network.

20 Claims, 5 Drawing Sheets

(56) References Cited

U.S. PATENT DOCUMENTS

| | | | |
|---|---|---|---|
| 2010/0148940 A1* | 6/2010 | Gelvin | H04L 67/12 340/286.02 |
| 2012/0302287 A1* | 11/2012 | Wright | G08G 1/0965 455/556.1 |
| 2015/0015275 A1* | 1/2015 | Huang | G01M 5/0083 324/633 |
| 2015/0080044 A1* | 3/2015 | McHenry | H04W 4/38 455/515 |
| 2018/0343072 A1 | 11/2018 | Kiannejad | |

* cited by examiner

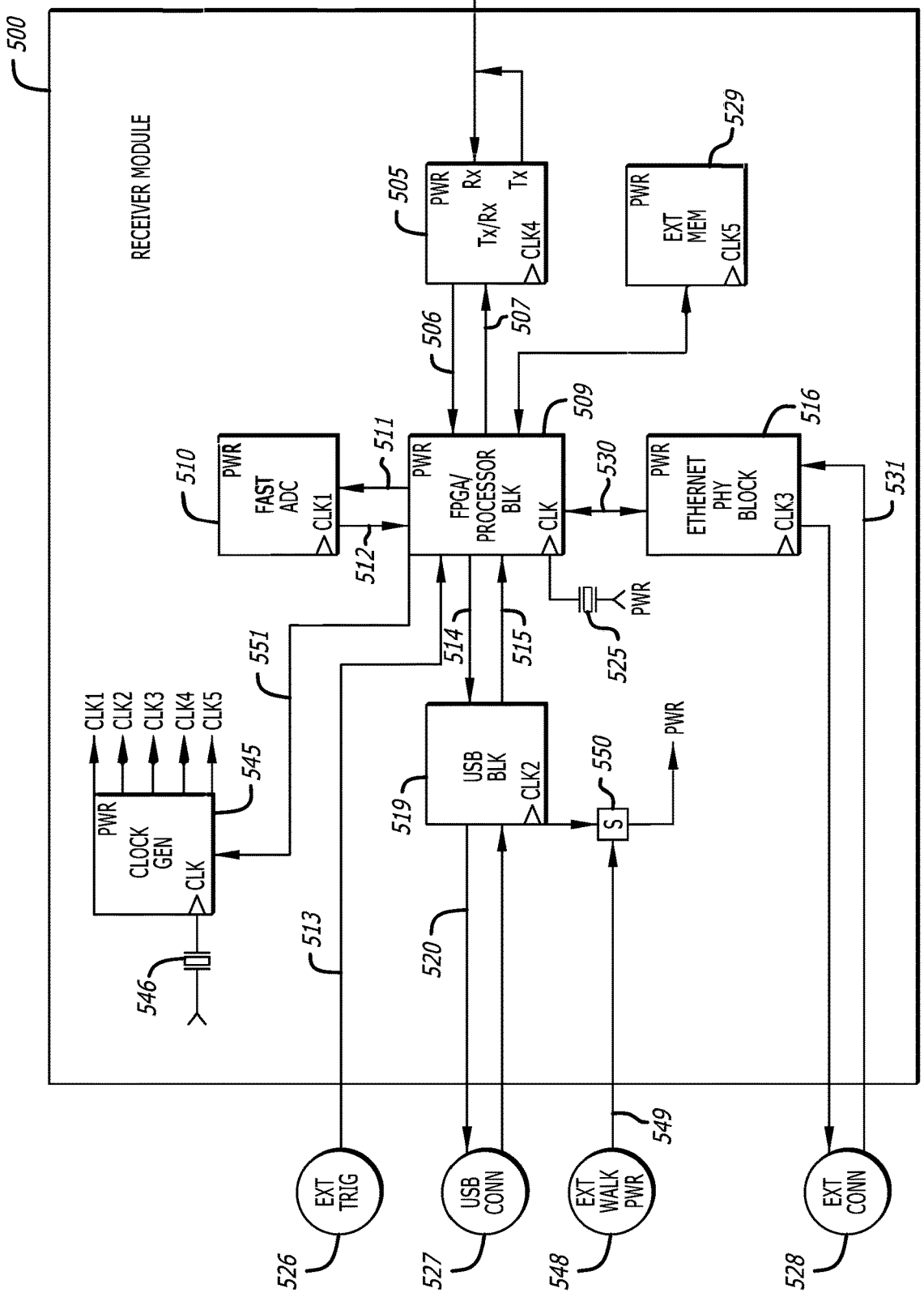

WIRELESS RADIO FREQUENCY INSTRUMENTATION AND ADAPTIVE NETWORK MANAGEMENT SYSTEM

CROSS REFERENCE TO RELATED APPLICATIONS

This application is a continuation of U.S. application Ser. No. 16/813,039 filed Mar. 9, 2020, which is a continuation of U.S. application Ser. No. 16/036,934 filed Jul. 16, 2018, which issued on Mar. 10, 2020 as U.S. Pat. No. 10,587,352, which is a continuation of U.S. application Ser. No. 15/166,751 filed May 27, 2016, which issued on Jul. 17, 2018 as U.S. Pat. No. 10,027,429, which claims the benefit of priority to U.S. Provisional Application No. 62/168,566 filed May 29, 2015, which are hereby incorporated herein by reference in their entireties.

FIELD OF INVENTION

The present invention relates to the field monitoring wireless communication links.

BACKGROUND OF THE INVENTION

As the wireless communication needs grow in the commercial and military sector, not only is it necessary for the devices to comply with the communication standards to prevent FCC regulation violations, but also to ensure reliability of data delivery to the customer, which can often times be hampered by hardware failure, lack of adequate data management, and signal interference. There is also a need to be able to make accurate measurements at the receiving and transmitting source that may be at a remote site without the ability to be at the site, thus requiring the need to have a long range instrument that can measure RF power, perform spectral analysis to find interference, and take corrective action toward that interference remotely. The ability to have long distance remote RF power reads, and spectral analysis, cannot however be accompanied with long delay in rise time or large system video bandwidth which then would make the measurement less reliable and in need of overhead for correction and compensation. Most commercial signals have video bandwidth that approaches 100 MHz and most peak power detectors can handle such signals, but there are signals that approach 200 MHz bandwidth such as multi-carrier wireless or high data rate satellite signals for which the peak power detectors are not a viable solution. In this case a swept frequency measurement could at least give an average power for the signal. Finally, in-depth analysis of signals requires the ability not just to know the amplitude in time but also modulation and spectral distribution in the frequency domain.

The market needs a device that can deliver wide measurement bandwidth, that can cover most if not all signal bandwidth, with a long distance remote measurement capability that does not introduce rise time delay through a physical link to the user, and can deliver raw unprocessed data with minimal system video bandwidth. The market also needs a system that is modular in platform and allows for construction of a unique system based on user choice for what kinds of modules can be put together in a system to achieve desired customer performance and functionality. Not to mention a networking capability that allows data management solutions on its own or as part of a greater network management solution, specifically for cellular networks.

BRIEF DESCRIPTION OF THE DRAWINGS

FIG. 5 presents an exemplary block diagram of the receiver module of the invention.

DETAILED DESCRIPTION

Figure 1:
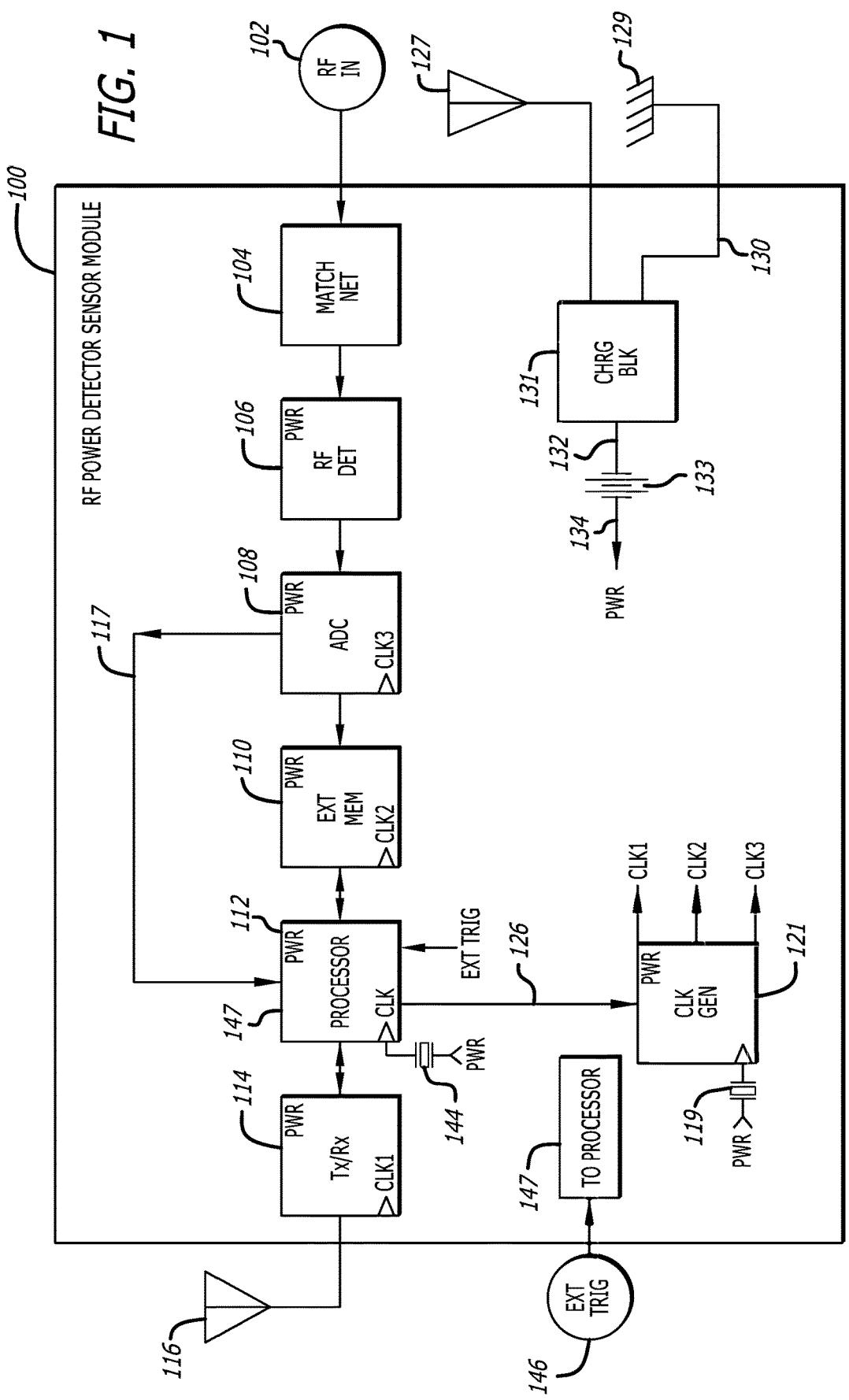
FIG. 1 is a block diagram of an exemplary RF power detector sensor module.

The system is composed of 5 modules: four wireless sensor modules, and a receiver module. The five modules come as modular platforms which allow the system to be functionally various and user defined. The system is duplex, allowing two-way communication between the receiver module and sensor modules. There are four sensor module types: standalone RF power detector sensor module 100, standalone spectrum analyzer sensor module 200, dual function sensor module 400, and RF interference and noise filtering sensor module 300. The receiver module 500 sends instructions to the dual function sensor module to switch between either time domain mode data acquisition which can give peak and RMS instantaneous power reads, or swept frequency domain data acquisition which gives spectral information regarding the sampled RF signal as well as average power of the RF signal. Both functions cannot be active at the same time, and the switching of functions can take place at the discretion of the user.

The detector section for either the standalone RF power detector sensor module or dual function sensor module detects RF power incoming into the respective sensor module through a matching network and detects the RF power using either RMS, log, or peak RF power detector turning pulsed or continuous RF power to a DC signal. The detected DC signal is then digitized by an ADC (analog to digital converter). The signal emerging from ADC is sent to external memory where it is stored and read out by a microcontroller. The microcontroller sends the data to an RF transceiver which modulates the signal using FSK (Frequency Shift Keying) and then using the attached antenna will send the signal to the receiver module.

The spectral analysis section for either the dual function sensor module or the standalone spectrum analyzer sensor module is made up of a signal conditioning block which readies the signal of interest for sampling. Then an ADC samples the signal of interest and digitizes the signal. The sample length of a signal might be very large containing many harmonics and possessing a bandwidth of 200 MHz. Thus, the digitized data is written to an external memory device. Once all the data is sampled and written to external memory a microcontroller/processor reads out the sampled data and turns it into predetermined packets of data. These packets are then transmitted to the receiver module using a transceiver that utilizes FSK modulation schemes which are least energy intensive and most robust.

Presently and in the foreseeable future the world is awash with RF signals, both as noise and signals carrying data for all kinds of applications, most notably telecommunications and internet. The result is many instances of interference which can be quite costly to remove with all current solutions, requiring physical removal or restructuring of infrastructure. Interference is happening because the transmitter of interest which is broadcasting the signal that is wanted is in position with another transmitter that is broadcasting an unwanted signal in such a way as to mimic the Young Double Slit (YDS) experiment. In essence the transmitters are acting as two slits that are sources for RF and because of their position and proximity are producing an interference effect for the receiver.

The interference filtering sensor that is part of this current invention is the automated solution to that problem. This sensor works in conjunction with the spectrum analyzer sensor, dual function sensor, and RF power detector sensor. Once the other sensors collect the appropriate data and send it to the receiver module for analysis, the source, direction, strength and frequency of the interferer are determined. The receiver module will then construct the profile of the appropriate RF signal that would filter the interfering signal to below acceptable threshold levels where functionality is maintained. The RF interference and noise filtering sensor module is not a jamming device as it will not willfully attack the source of interference; rather it filters unwanted noise and harmonics at the input of the device for which the interference needs to be reduced.

The RF interference and noise filtering sensor module first receives the signal profile either from the receiver module or directly from another sensor module like the spectrum analyzer sensor module through the receiver of the transceiver 306 on the front end of the spectrum analyzer sensor module. Then the RF interference and noise filtering sensor module will synthesize out band frequency signals that are anti-phase to the signals coming from the interfering source. The transmitter 314 on the RF interference and noise filtering sensor module will send out the filtering RF signals that will add destructively to the interference signal. The transmitter 314 is the filter output of the RF interference and noise filtering sensor module. The sensor RF interference and noise filtering sensor module will be acting as a third slit in the YDS arrangement which is in very close proximity to the receiver and thus will filter out inter-modulation signals, and other signals that would saturate the receiver and degrade the quality of the system.

Once the filtering is complete the RF interference and noise filtering sensor module reports its success or failure to the receiver module using the receiver of the transceiver on its front end. In essence the RF interference and noise filtering sensor module acts as another indicator for the receiver module as to the success or failure of the interference removal strategy or algorithm used. The way the sensor RF interference and noise filtering sensor module determines if the strategy for filtering succeeded is by getting direct measurement results from the spectrum analyzer sensor module to which it has a digital connection. The new measurement is compared to the previous data sent by the receiver module and an interpolation algorithm determines if certain thresholds are met, if they are then the filtering has worked, if not it has not.

In that case a failure response is sent to the receiver module through the transmitter of the interference filtering sensor transceiver 306. Once that happens the process is started anew in which the receiver module sends instruction to both the spectrum analyzer sensor module and RF power detector sensor module to collect more data and create a new profile of the interferer so that a new set of filtering parameters can be constructed for sending to the RF interference and noise filtering sensor module. The receiver of the transceiver for the RF interference and noise filtering sensor module is also used to send diagnostic as well as sample of the synthesizer output signal for verification of function to the receiver module.

The receiver module receives the signal from the spectrum analyzer sensor module and RF power detector sensor module and performs numerical and logical analysis of the incoming signals. It finally formats the signals and then broadcasts the signals either through an Ethernet LAN connector or a USB connector to a PC or display of the user's choosing. The receiver module uses a FPGA which has the digital hardware on it for conducting FFT (Fast Fourier Transform) necessary for spectral analysis of the incoming data from either the dual function sensor or RF power detector sensor module. However, if the user is not interested in spectral analysis and wants a power detector only, then a microprocessor/microcontroller can be used to analyze the detected RF power. Both the FPGA and the microprocessor/microcontroller can be of any type as is understood by those who are skilled in the art. The FPGA also has formatting logic for the time domain data incoming from the RF power detector sensor module for display. The receiver module has external memory block to the FPGA which can record data for a period of time and show the evolution of the modulated RF signals in real time and thus capture anomalous events occurring in a sequence of time. The receiver module also has a flash memory block which allows for the reprogramming of the FPGA with all the required digital logic and numerical analysis blocks to conduct the analysis of the incoming data signals in case of a power outage or turning off the system when it's not in use.

Both receiver module and sensor modules have external triggering capability so that they can sample and analyze pulsed systems and power.

RF Power Detector Sensor Module:

FIG. 1 titled RF POWER DETECTOR SENSOR MODULE is a block diagram of an exemplary RF power detector sensor module. All signal propagation can be wired or wireless. Input connector 102 which can be N-type male or SMA male connectors or any type of connector for interfacing between the RF power detector sensor module and the source of signal of interest, couples the RF input signal to (impedance) matching network 104. After the matching network 104 the signal is coupled to the RF power detector 106. The RF power detector 106 can be peak, average, RMS, log, thermocouple, thermal, radiation detect, optical, digital sampler, or any other RF detector type as understood by those skilled in the art. After detection the detected signal is coupled to the ADC sampling block 108 for sampling. The ADC 108 can be of Flash, sigma-delta, dual slope converter, successive approximation converter, or of any type known to those skilled in the art. Once sampled, the detected signal, now in digital form, can be written into memory 110, an external memory. This external memory block 110 can be flash, SDRAM, DDR, DDR2, DDR3, DDR4 or any memory type known to those skilled in the art.

The digitized detected signal now in memory can be read from memory using a microcontroller/processor 112. The coupling between the memory 110 and the microcontroller/processor 112 preferably is a duplex path allowing for the microcontroller/processor 112 to read from or write into the memory 110. The microcontroller/processor 112 also has a duplex path 17 to the ADC 108, allowing the microcontroller/processor 112 to get digitized data directly from the ADC 108 without having the data first be written into external memory. This is a useful feature that allows direct access by microcontroller/processor 112 to digitized data when the data is short in duration. Path 117 also allows for the microcontroller/processor 112 to write to the registers of the ADC 108 and also enable the ADC 108. This way the ADC 108 can change its measurement range and be turned on or off.

When the microcontroller/processor 112 has access to the digitized detected data, it must packetize that data so that it can be transmitted to the receiver module, to be subsequently described. Once the packets are ready the microcontroller/processor 112 sends the packetized data to an FSK transceiver 114. The microcontroller processor 112 can be a RISK processor, an FPGA, an ARM or any other processor type known to those who are skilled in the art. The transceiver 114 can be FSK or any other type known to those who are skilled in the art. The duplex path between the microcontroller processor 112 and the transceiver 114 also allows the transceiver 114 to send instructions received from the receiver module for programming other blocks in the RF power detector sensor module, such as ADC 108 and external memory 110. The transceiver 114 will send the RF packets constructed by the microcontroller/processor 112 to the receiver module by wirelessly transmitting the packets using antenna 116. The antenna 116 can be simple dipole, dish, polarized, array, or any other antenna type known to those who are skilled in the art.

The blocks described above require power and clock to properly function. Four of the above blocks, microcontroller/processor 112, ADC 108, external memory 110, transceiver 114 require individual clock signals for proper function. To achieve clocking for those blocks a clock generating chip 121 is used. This clock generating chip 121 has to be programmed in order to generate the different types of clock signals needed by the blocks. The microcontroller/processor 112 uses path 126 to program the synthesizing registers of the clock generating chip 121 which then outputs clock signals Clk1 to the transceiver 114, Clk2 to external memory 110, and Clk3 to ADC 108. The microcontroller/processor 112 uses its own clock source from crystal oscillator 144. This oscillator 144 can be of any type known to those skilled in the art. The clock generating chip 121 also has its own oscillator 119 for clock reference and source.

What remains to be described for this RF power detector sensor module is the power source for all blocks and its elements. All the blocks in this RF power detector sensor module that are essential to functionality require DC power to operate. This DC power source is a battery 133 which can be Nickle type, Lithium Ion, cell, or any other type known to those who are skilled in the art. The battery 133 is connected to distribution points by path 134. The power is distributed as PWR to clock generator 121, to clock generator reference oscillator 119, to oscillator Clk source of microcontroller processor oscillator 144, to transceiver 114, to microcontroller/processor 112, to external memory 110, to ADC 108 and to RF detector 106.

The battery 133 needs to be recharged periodically so it can continue to deliver power to the elements in the RF power detector sensor module that need it. The recharging is sourced both from renewable energy such as solar and ambient RF power of the near field. For ambient RF, the antenna 127 receives the ambient environmental RF power from any source that is around and couples it to charging block 131. The charging block 131 is a battery management technology such as a buck converter or any other type known to those who are skilled in the art. The charge is then fed to the battery through path 132 to battery 133. For using solar for the renewable charging source, a small form factor solar panel 129 can collect energy from the sun and convert it to DC current and through path 130 send it to the charging block 131. Here again the buck converter manager can allocate that charge to the battery 133.

For pulsed power input signals there needs to be external triggering that is brought to the sensor to accommodate the pulses to be measured. The connector 146 brings the external trigger into the sensor and passes it to the processor 112 through path 147. The connector 46 can be SMA or any other type of connector known to those skilled in the art.

Figure 2:
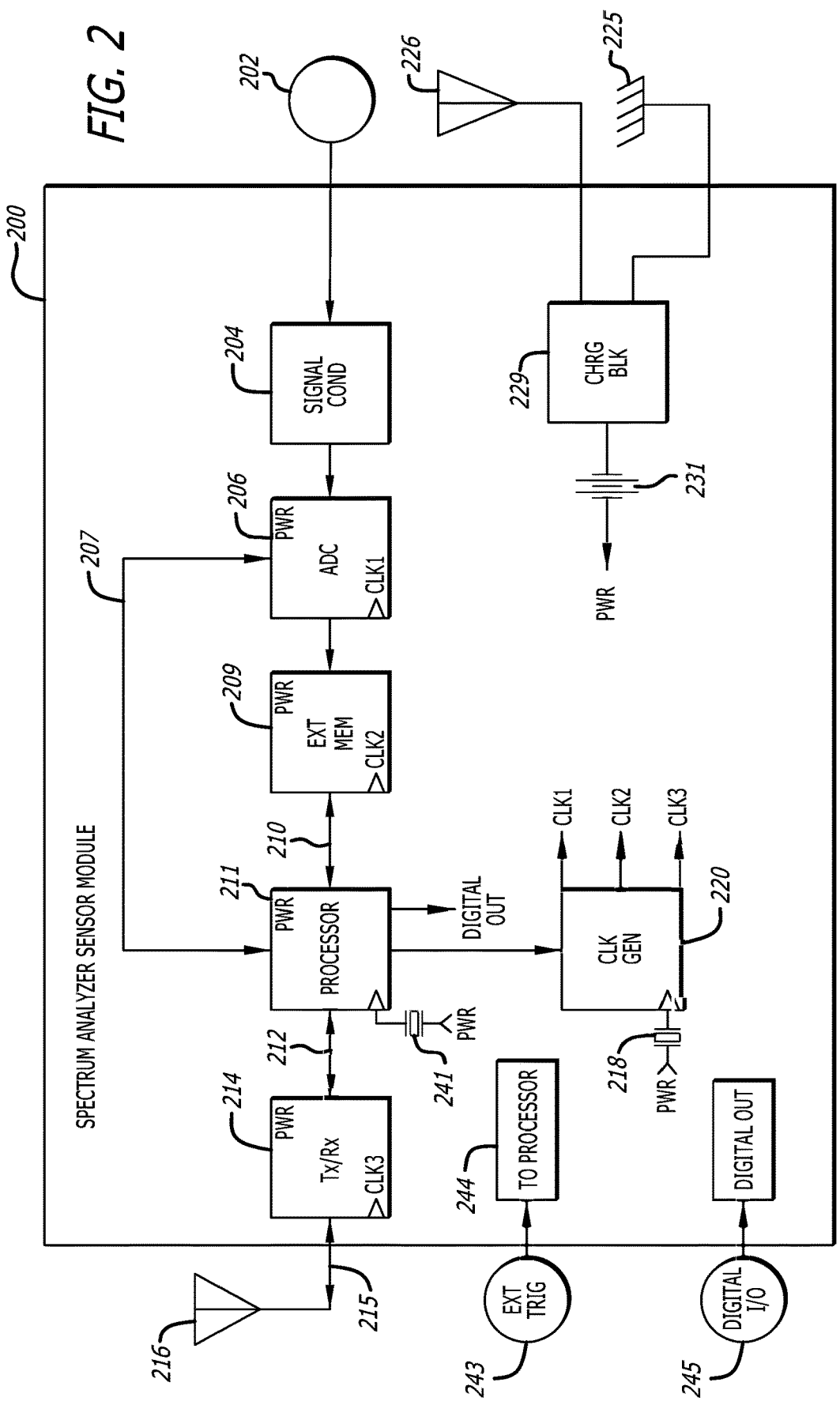
FIG. 2 is a block diagram for an exemplary spectrum analyzer sensor module.

Spectrum Analyzer Sensor Module:

FIG. 2 is a block diagram for an exemplary spectrum analyzer sensor module. The RF signal of interest enters the input connector 202 which can be an SMA or N-type male or any other RF signal interfacing connector known to those skilled in the art. The RF signal then is coupled to the signal conditioning block 204 which filters and cleans the signal. Once the signal is filtered, the signal is then coupled to the ADC 206. The signal is sampled at the necessary sampling speed to capture the entire signal according to the Nyquist criterion. The ADC 206 can be of any type as understood by those skilled in the art.

Once the signal of interest has been digitized it is written into external memory 209. The external memory 209 can be of any memory type known to those who are skilled in the art. The signal can be read from external memory 209 through duplex path 210 by microcontroller/processor 211. The microcontroller/processor 211 is also connected by duplex path 207 to ADC 206 so that it can write to ADC 206 registers and have access to output data from ADC 206 directly. This allows the microcontroller/processor 211 to bypass the external memory 209 if the signal of interest is small or there is no need for long recording of signals. The microcontroller/processor 211 can be a RISK processor or any other type of processor known to those skilled in the art.

Once the digitized signal of interest is accessed by microcontroller/processor 211, either from ADC 206 directly or from external memory 209, it is formatted into predetermined RF packets to be transmitted. The packetized data is sent through duplex path 212 to a transceiver 214. The transceiver 214 can be of FSK modulation scheme or any other type as known by those skilled in the art. The transceiver 214 can also send instructions from the receiver portion of transceiver 214 to microcontroller/processor 211 that can update the microcontroller/processor 211 on how to manage the other blocks. Once in possession of the RF packets from the microcontroller/processor 211 the transceiver 214 couples the data through duplex path 215 to the antenna 216 which is wirelessly linked to the receiver module. The antenna can be a dipole, dish or any type as understood by those skilled in the art. The antenna 216 can receive transmissions from the receiver module that is wirelessly linked to the spectrum analyzer sensor module to update the spectrum analyzer sensor module with measurement instructions.

All the sensor elements described above have to be powered and clocked to achieve functionality. The blocks have different clock needs, as in different frequency clock signals. Multiple clock signals of differing frequency types are generated using a clock generating chip 220 that can be programmed to produce many clocking signals of different frequencies. The microcontroller/processor 211 is connected to programming registers of clock generating chip 220 for such programming. This way the clock generating chip 220 can be programmed to synthesize clock signals: Clk1 for ADC 206, Clk2 for external memory 209 and Clk3 for transceiver 214. The clock generating chip 220 obtains its own clock/reference source from an oscillator 218. The microcontroller/processor 211 also has to have its own oscillator 241 for a clock source. Both the clock generating chip and oscillators can be of any type known to those skilled in the arts.

The power needed to enable the function of all these blocks has to be a DC source and must come from a battery 231. The battery 231 sources current and voltage to all circuit elements and distributes the power PWR for ADC 206, to external memory 209, to microcontroller/processor 211, to transceiver, to clock generating chip 220, to oscillator 218 and to oscillator 241.

The battery 231 needs to be periodically charged so that it can continuously deliver power to the blocks. The source of recharging is a combination of ambient near field RF and solar. The antenna 226 can receive ambient near field RF and couple it to the charging block 229 which can be a buck booster and battery manager type chip. Both antennas 226 and charging block 229 can be of any type known to those skilled in the art. The charging block 229 can then deliver charge to the battery 231. The other charging source can be solar. The small solar panel 225 can convert solar energy into current and deliver that energy to the charging block 229. The solar panel can be of any type and dimension known to those skilled in the art.

For pulsed power input signals there needs to be external triggering to accommodate the pulses to be measured. The connector 243 can couple a trigger signal to the processor 211 through path 244. The connector 243 can be SMA or any other type of connector known to those skilled in the art.

There may be a need to send digital information directly from the spectrum analyzer sensor module to the RF interference and noise filtering sensor module to be described, in which case there needs to be a digital output connector that sends the signal to the RF interference and noise filtering sensor module. The digital signal is sent from processor 211 to connector 245. The connector can be of any type as understood by those skilled in the art.

Figure 3:
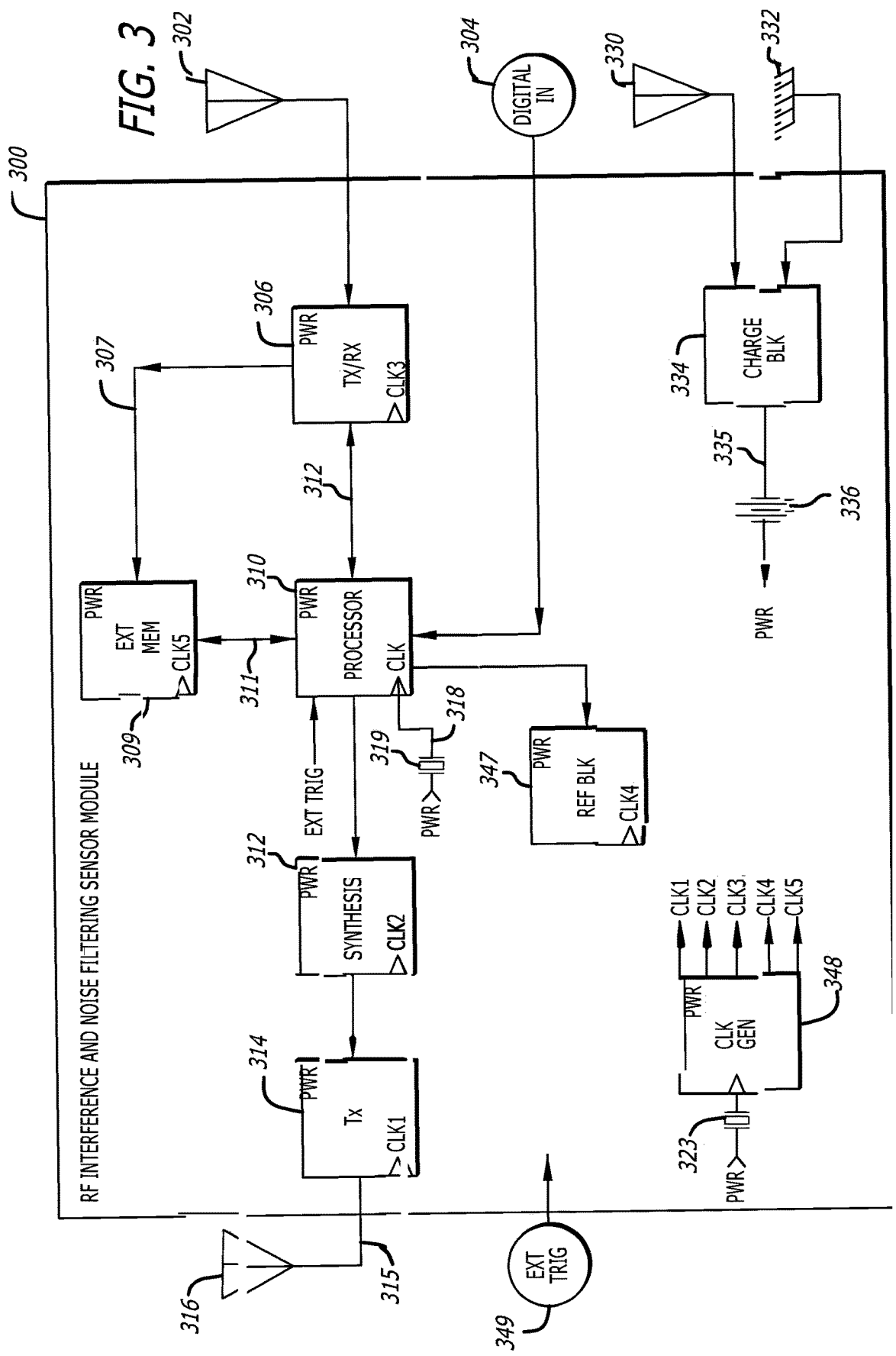
FIG. 3 is a block diagram of an exemplary RF interference and noise filtering sensor module.

RF Interference and Noise Filtering Sensor Module:

FIG. 3 is a block diagram of an exemplary RF interference and noise filtering sensor module. In this figure the input data for constructing the cancelling RF signal comes either from antenna 302 or digital interface 304. The data from antenna 302 is coupled to transceiver 306. The antenna and transceiver can be of any type known to those skilled in the art.

The data coming into the sensor can be either in analog form through antenna 302 and receiver of transceiver 306 or it can be digital coming directly from the spectrum analyzer sensor module. This digital data can come into sensor from digital interface 304 and directly pass to the processor 310. Otherwise the analog data is digitized by the transceiver 306 and can be either sent to external memory 309 through path 307 or to the processor 310 through duplex path 308. The processor 310 is also connected to external memory 309 through duplex path 311. The external memory and processor on this RF interference and noise filtering sensor module can be of any type as understood by those skilled in the art.

The blocks consisting of the processor 310, transceiver 306, and external memory 309 make up the data profile recording and exchange of the signal that is to be constructed to cancel or reduce the interfering signal. The processor 310 is connected to RF reference 347 block and the synthesis 312 block. The reference 347 block is used to produce the reference RF signal needed by the synthesis 312 block to produce the interference cancelling RF signal. The processor 310 instructs and manages both blocks to optimize and actualize the signal production. The reference 347 block is needed as the need for producing certain frequency specific reference signals with high precision might be greater than the clock generating chip 348 can produce, so a dedicated block is needed. The synthesis 312 block is connected to a transmitter 314 block and sends the profile of the cancelling RF signal to the transmitter 314. The transmitter 314 transmits the cancelling RF signal through path 315 for transmission through antenna 316.

The synthesis 312 block can be a Direct Digital Synthesizer (DDS) made up of any additional blocks known by those who are skilled in the art. The reference 347 block can be oscillators and other blocks that are of any type known to those who are skilled in the art. The transmitter 314 can be of any high-powered transmitter. The antenna 316 can be a directional antenna with many reflectors or of any type. The processor 310 has to have its own oscillator as a clock source. The oscillator 319 is the processor clock signal source. It allocates a clock signal through path 318 to the clock input port of the processor 310.

The clock generating chip 348 is tasked with providing clock signals to all blocks on the RF interference and noise filtering sensor module that need it. The clock signals distributed by the clock generating chip 348 are: Clk1 for transmitter 314, Clk2 for synthesis 312, Clk3 for transceiver 306, Clk4 for Reference 347, Clk5 for external memory 309. The clock generating chip 348 is connected to the processor 310 to receive instructions for clock output register programming received by the processor 310 through transceiver 306. The clock source for the clock generator 348 block comes from oscillator 323. The oscillator 323 and clock generator chip 348 can be of any type.

The power source for all blocks that need DC power comes from battery 336. The battery 336 distributes power PWR to clock generating chip 348, to transmitter 314, to synthesis 312 block, to external memory 309, to processor 310, to transceiver 306, to reference 347 block, to oscillator 319, and to oscillator 323.

The battery 336 needs to be recharged periodically to be able to provide continuous power. The source for recharge is a combination of ambient RF from the near field and solar. The antenna 330 receives the ambient RF and passes it to charging 334 block which is a buck regulator or a charging and battery management chip of any type known in the art. The antenna 330 can be a dipole or of any type. The solar panel 332 gathers solar energy and passes that energy to charging 334 block. The solar panel 332 can be of any type and dimension known in the art. The charge from either source gathered by the charging 334 block can be sent to the battery 336 through path 335.

For pulsed power input signals there needs to be external triggering that is brought to the sensor to accommodate the pulses to be measured. The connector 349 brings in the external trigger into the RF interference and noise filtering sensor module and passes it to the processor 310 through path 348. The connector 349 can be SMA or any other type of connector known to those skilled in the art.

Figure 4:
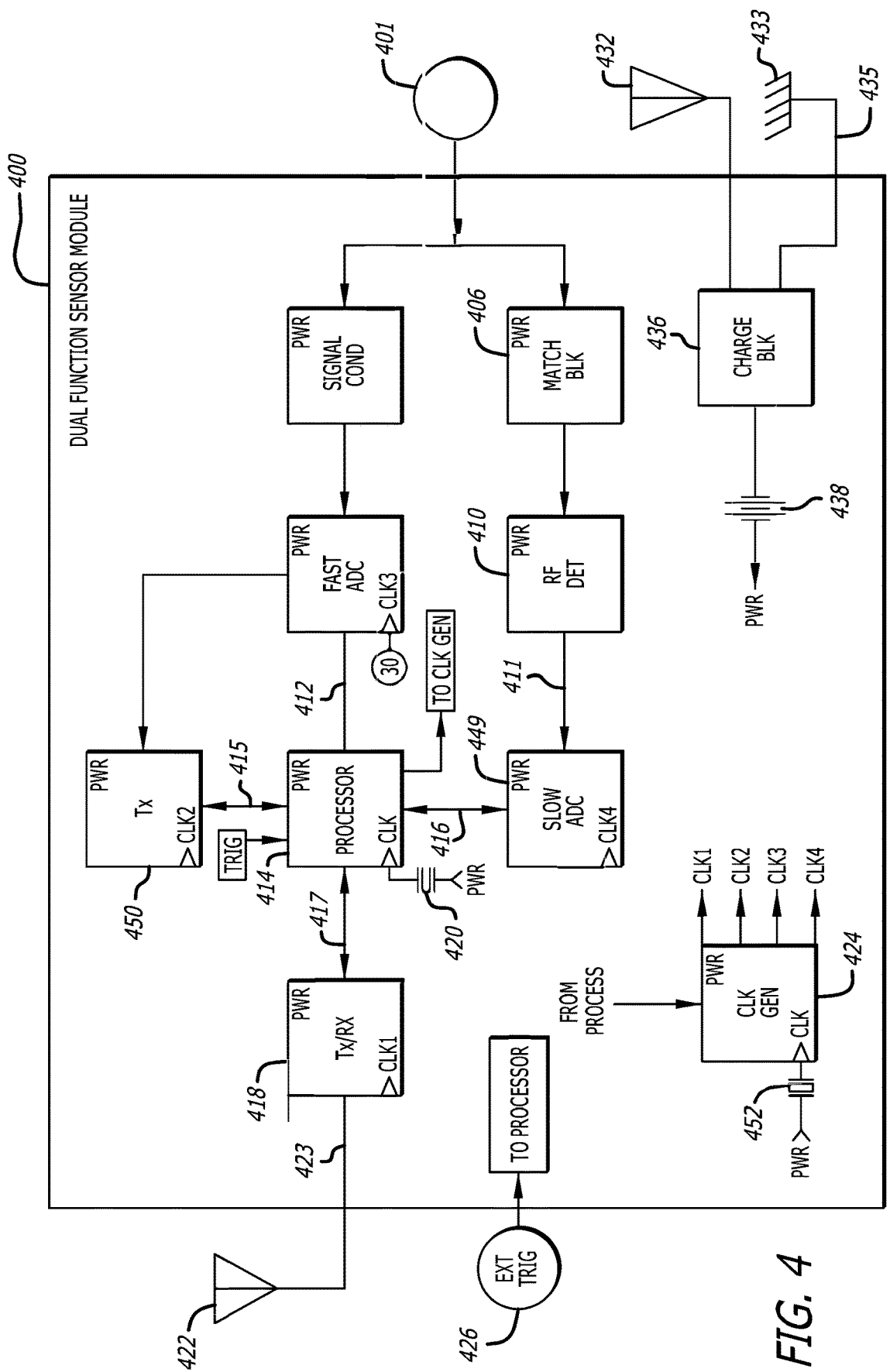
FIG. 4 is block diagram of an exemplary dual function sensor module.

Dual Function Sensor Module:

FIG. 4 is block diagram of an exemplary dual function sensor module. Shown in FIG. 4 are two distinct branches of signal sampling and detection coupled to the processor 414 that make up the dual functioning capability of the dual function sensor module, thus making this dual function sensor module simultaneously a spectrum analyzer and RF power detector. Input connector 401 is coupled to two input paths, with each input path leading to a different functional branch. One input path leads to the spectrum analyzer branch of the dual function sensor module, while the other input path leads to the RF power detector branch of the dual function sensor module.

One input path is coupled to signal conditioning block 405 which is coupled to fast sampling ADC 409, which can be an ADC of 1 Gsps or any other ADC type. The other input path is coupled to matching block 406 which is coupled to detector block 410. The detector block 410 can be peak, average, RMS, Diode, thermocouple, thermal, radiation, optical, and digital sampler. The detector block 410 outputs detected signal 411 to slow sampling ADC 449, and then outputs digitized signal 416. The fast sampling ADC 409 outputs digitized signal 412. The digitized signals 416 and 412 do not exist at the same time because only one ADC is enabled at any one time.

The processor 414 receives either digitized signal 416 or 412 for processing into transmission packets. Although ADC 409 can write to processor 414 directly, its data output may be too long for the processor 414. Thus ADC 409 can output data either directly to external memory 450 or through the processor 414 through duplex path 415. The external memory 450 can be of any type. The processor 414 can also write to or read from memory 450. The processor 414 sends digital data of either RF detect branch or spectrum analyzer branch to transceiver 418 through path 417 in form of RF packets. It can also receive instructions from the receiver module through path 417.

The transceiver 418 can be any transceiver capable of doing FSK (Frequency Shift Keying), QAM (Quadrature Amplitude Modulation), PSK (Phase Shift Keying), AM (Amplitude Modulation), and PM (Phase Modulation), OOK (On-off Keying), CPM (Continuous Phase Modulation), OFDM (Orthogonal Frequency-division multiplexing), RF4CE, Zigbee iControl, Bluetooth/BLE, wavelet modulation, wireless USB, TCM (Trellis coded Modulation), spread spectrum modulation techniques such as FHSS (Frequency Hopping Spread Spectrum) and other spread spectrum techniques, and any variants of the modulation schemes mentioned as understood by those who are skilled in the art. The transceiver 418 then transmits the data from the processor 414 through path 423 using antenna 422. The antenna 422 can be a microstrip, meandering dipole, aperture, dish, dipole, loop, antenna array or any combination of antenna designs as understood by those skilled in the art.

The sensor peripherals need different clocking schemes to achieve functionality and that is where the clock generating chip 424 comes in. The clock generating chip 424 receives instructions from processor 414 which program its registers to output clock needed for all purposes on the board. The clock generating chip 424 output clocks for the following: Clk1 for transceiver 418, Clk2 for external memory 450, Clk3 for ADC 409, Clk4 for ADC 449. The clock generating chip 424 has to have its own clock source which it gets from an oscillator 452. Clock generating chip 424 can be a PLL, Direct Digital Synthesizer, Digital Synthesizer, timing signal generator, and any other clock generating technique. The processor 414 also requires its own clock source for proper functioning which it can get from oscillator 420. The oscillator 452 and oscillator 420 can be crystal oscillators and any other type of similar reference clock scheme.

There is also need for external triggering for the dual function sensor module if the signal in question for sampling, detection and analysis is of pulsed type as opposed to continuous wave. This requires external triggering that can be coupled through connector 426 to processor 414. The connector 426 can be SMA or any other known type.

The peripherals of the dual function sensor module need power to function. There is a battery 438 which serves as the main source of voltage and current for the peripherals on the dual function sensor module. The battery 438 can be cylindrical cell, button cell, prismatic Lithium-Ion cell, polymer cell, and pouch cell or any other type battery. The battery 438 outputs voltage and current, which power is distributed to all circuit elements of the Detector module. The battery output is broken into 409 paths which in turn deliver power to all circuit elements that need it. The distribution of power PWR is to oscillator 452, to clock generating chip 424, to transceiver 418, to oscillator 420, to processor 414, to external memory 450, to ADC 409, to RF detector 410, and to ADC 449.

The battery 438 is rechargeable, and that task is accomplished by the charging block 436 which can be a linear standalone Li-Ion battery charger or a switching supply, or a switching buck boost or any other type known to those skilled in the art. The battery 438 is charged using combination of solar energy and ambient RF energy of the near field. The antenna 432 gathers ambient RF near field energy and couples it to charging block 436 which is then used to charge the battery 438. Solar panel 433 also gathers energy from the sun and passes it to the charging block 436 through path 435. Either form of energy is managed and sent to charge the battery 438.

Receiver Module:

FIG. 5 presents an exemplary block diagram of the receiver module of the invention. The receiver module is responsible for the reception of the detected and digitized signal from all the other sensor modules. It then conducts numerical analysis, filtering, characterization, conversion, and formatting of the received signal and then displays the results on either a PC, or a laptop of the user's choosing. It can also play a coordinating role to create a network of sensor modules for proactive adaptive analysis or a mobile network of sensor modules in which the attention of analysis can shift from one set of sensor modules to another. Since the system is a duplex system, the receiver module can send instructions to all sensor modules that are part of its network. In essence the receiver module is the master part of the system and the sensor modules are the slave parts of the system. The receiver module sends data to the sensor modules that set the values on the registers of the blocks on the sensor modules through the on board processors that are on all sensor modules which in turn determines which outputs are active for functionality, thus making the system adaptive to changing measurement needs.

Referring to FIG. 5, the receiver module receives and transmits signals from and to the sensor modules with FSK modulation through the antenna 502. The duplex signals are transmitted from the receiver to the antenna 502 from the transceiver 505. The signals from the sensor modules are received by the receiver module's transceiver 505. The transceiver 505 is interfaced to an FPGA/microprocessor block 509. The transceiver 505 sends received data to the processor block 509 through path 506, while receiving instruction data for sensor modules from processor block 509 through path 507. The processor block 509 is interfaced to several other blocks that complete the functionality of the receiver module.

The processor block 509 is preferably comprised of an FPGA if the system is to have both time domain amplitude RF power detection capability as well as frequency domain spectral analysis capability. The processor block 509 using an FPGA will contain the digital hardware logic that can do the spectral analysis, time domain representation amplitude conversion, digital filtering, and formatting for display that is needed for both those functions. Yet the FPGA needs also several peripherals interfaced to it for obtaining full functionality. The FPGA processor block 509 needs to have a flash device block 510 that will reprogram the FPGA in case of a power outage or when the device is turned off. The flash device 510 can be of either NAND or NOR technology types. The flash block 510 can reprogram the FPGA processor block 509 by sending a hardware and software image file to the FPGA by path 512. Before the user receives the system for use, the flash block 510 is programmed with the necessary hardware and software image file by the FPGA processor block 509 using path 511.

The processor block 509 that is comprised of an FPGA for doing time domain and frequency domain analysis may need an external memory block 529 which could be used to store incoming data for sequence storage and analysis by the FPGA processor block 509. The external memory block 529 may be of type DDR SDRAM, SDR, DRAM, ROM or any other types known to those skilled in the art. The data to external memory block 529 would be written to and read from the external memory block 529 by the FPGA processor block 509. The external memory block 529 can be used to capture anomalous events and long sequence of unusual signal modulation, which can then be read back and analyzed by the FPGA processor block 509.

The blocks in the receiver module need to have clock signals in order to function properly. The clock generating chip 545 produces the clock signals the peripherals of the receiver module need in order to achieve functionality. The clock signals that the clock generating chip 545 produces are as follows: Clk1 for Flash block 510, Clk2 for USB block 519, Clk3 for Ethernet block 516, Clk4 for transceiver block 505, and Clk5 for external memory block 529. The clock generating chip 545 has a dedicated clock source through oscillator 546 that provides the clock signal to the clock generating chip 545. The clock generating chip 545 can be programmed by the FPGA/processor block 509 to output clocks of whatever frequency is needed for any peripheral through path 551.

The overall system can be set up to be part of a LAN. This means not only is the system capable of broadcasting data over a LAN, but it can also receive data requests from multiple users on the LAN. Thus, in order to achieve this functionality, the receiver module has to have a RJ45 528 connector to be able to give access to LAN for data and requests. The receiver module will also have to have an Ethernet Phy 516 which can format data for LAN and send data to LAN, while receiving requests from LAN through path 531. The Ethernet block 516 has to be interfaced to the FPGA processor block 509 from which it gets data, while sending requests from LAN through path 530.

The FPGA processor block 509 is interfaced with a USB block 519 which provides formatting for the serial signals sent from the FPGA processor block 509 and provides the user selection data sent from the user PC interfaced to the Receiver. The user PC has software for the user to interface with the system. The FPGA processor block 509 sends data to the USB block 519 through path 514 while the FPGA processor block receives requests from the USB block 519 through path 515. The USB block 519 is connected to a USB connector 527 for reception of user requests and through path 520 for data output.

The USB block 519 is also used as a source of power for FPGA processor block 509 and all other peripherals on the receiver module board. The USB block 519 delivers power to PGA block 509, to Ethernet block 516, to the external memory block 529, to the transceiver block 505, to the rlash block 510, to the oscillator clock 525, to the clock generating chip 545 and to the oscillator 546.

If a USB port from the PC cannot provide enough current and voltage to all the peripherals of the receiver module, then standard power from building outlets can be used. This power can be brought to the receiver module from standard connector 548 through path 549 to switch 550 which can switch power being distributed from USB to outlet or vice versa.

There is a crystal oscillator block 525 that distributes a reference clock signal to the FPGA/microcontroller processor block 509. If this clock signal is fed to the FPGA processor block 509, it can be used by the FPGA to produce clock signals of a variety of frequencies. The FPGA block 509 can use the reference clock signal along with its internal PLL (Phase Locked Loop) logic elements to produce clock signals of different frequencies which are usually whole number multiples of the reference signal and can be outputted from the FPGA block 509 to other peripherals such as external memory block 529 and Ethernet block 516.

An external trigger option is available for pulsed RF power to be analyzed by the system. The external trigger can be inputted into the system through an external trigger SMA connector 526 on the receiver module (FIG. 5). The external trigger signal needs to be a standard TTL logic signal that will traverse through the receiver module to the FPGA/microprocessor block 509 through path 313. The trigger will determine when the data is collected and analyzed by the system.

In the present invention, the specific measurements of RF power in time domain, spectral analysis in frequency domain, phase, and filtering of unwanted interference signals using synthesizable RF signals are done by the sensor modules. The dual function sensor module provides twofold capacity for both time domain RF power measurement and frequency domain spectral analysis. The receiver module portion of the invention is not new but is needed to accompany the sensor modules and provide overall system functionality.

In the present invention, the sensor modules are coupled in a wireless link between the sensor modules and what is called in the market as meter portion, herein referred to as the receiver module. Now multiple channels of measurement from multiple sensor modules can be coupled to a single meter, and a single meter can provide not only many measurement functions but act as a source to change to the RF environment in which the device operates. The system is thus not a meter in the traditional sense, but rather an adaptive system that can collect necessary data and then determine a plan of action to actively change the signals that are affecting an RF network such as a cellular system. The present invention can be used as a new type of network management tool or just instrumentation for true remote monitoring and simultaneous experimentation in many different areas of industrial application, manufacturing, or development.

The present invention thus comprises a combination of:
  an RF power detector sensor module;
  a spectrum analyzer sensor module which, in one embodiment, is a dual function;
  spectrum analyzer sensor module;
  an RF interference and noise filtering sensor module;
  a dual function sensor module; and
  a receiver module;
  all of the sensor modules being wireless;

and various sub-combinations of the sensor modules together with a receiver module which in essence orchestrates the operation and any interoperation of the sensor modules. Useful sub-combinations that can be set up to make a complete system include, but are not necessarily limited to:

1. Two RF power detector sensor modules and a receiver module, with each sensor module having different dynamic range, frequency of operation and input power capability.

2. Two spectrum analyzer sensor modules and a receiver module, each with different bandwidth.

3. One RF power detector sensor module and one spectrum analyzer sensor module with one receiver module.

4. Two RF power detector sensor modules of differing frequency of operation, dynamic range, and input power capability, one spectrum analyzer sensor module and a receiver module.

5. One RF power detector sensor module, two spectrum analyzer sensor modules of differing bandwidth and a receiver module.

6. One dual function sensor module, one RF power detector sensor module, one RF interference and noise filtering sensor module and a receiver module.

7. One dual function sensor module, one RF interference and noise filtering sensor module, and one spectrum analyzer sensor module and a receiver module.

8. One RF power detector sensor module, one RF interference and noise filtering sensor module, one spectrum analyzer sensor, and a receiver module.

9. Two dual function sensor modules with the power functions on each dual function sensor module differing in frequency of operation, dynamic range, and input power capacity. The spectrum analyzer functions on each dual function sensor modules differing by bandwidth. Along with a single RF interference and noise filtering sensor module and a receiver module.

10. Two RF interference and noise filtering sensor modules and one dual function sensor module with a receiver module.

11. One spectrum analyzer sensor module and one RF interference and noise filtering sensor module with a receiver module.

12. One dual function sensor module and one RF interference and noise filtering sensor module and a receiver module.

13. One dual function sensor module and one RF power detector sensor module with a receiver module.

14. One dual function sensor module and one spectrum analyzer sensor module and one receiver module.

15. One RF power detector sensor module, one spectrum analyzer sensor module, one dual function sensor module, one RF interference and noise filtering sensor module and a receiver module.

16. One RF power detector sensor module, and three spectrum analyzer sensor modules that differ in bandwidth with one receiver module.

17. Two spectrum analyzer sensor modules, and RF two power detector sensor modules. The spectrum analyzer sensor modules differ from each other in bandwidth while the RF power detector sensor modules differ from each other in frequency of operation, bandwidth, and input power capability. These sensor modules are coupled to a single receiver module.

18. Three RF power detector sensor modules and one spectrum analyzer sensor module with one receiver module.

19. Four RF power detector sensor modules with differing dynamic range, frequency of operation, and input power capability and one receiver module.

20. Four spectrum analyzer sensor modules covering different bandwidths and one receiver module.

21. Two spectrum analyzer sensor modules with different bandwidths and two RF interference and noise filtering sensor modules with one receiver module.

22. One spectrum analyzer sensor module and three RF interference and noise filtering sensor modules and one receiver module.

23. Three dual function sensor modules and one RF interference and noise filtering sensor module with a receiver module.

24. Two dual function sensor modules, two RF interference and noise filtering sensor modules, and one receiver module.

25. Three RF interference and noise filtering sensor modules and one dual function sensor module with one receiver module.

As used in the claims to follow, the word "instructions" is used in the general sense to include, among other things, settings, commands and other data, and "information" is also used in the general sense to include, among other things, status, settings, measurements and other data.

Thus, the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed:

1. An RF monitoring and diagnostic system comprising:
an RF power detector sensor module having an RF power detector sensor input and having a transceiver for receiving instructions from a receiver module and transmitting RF power detector measurements of an RF signal;
a spectrum analyzer sensor module having a spectrum analyzer input and having a transceiver for receiving instructions from and transmitting spectral analyses of an RF input at the spectrum analyzer input to the receiver module;
an RF interference and noise filtering sensor module having a transmitter for transmitting an RF signal, and having a transceiver for receiving instructions from and transmitting information to the receiver module;
a dual function sensor module having a simultaneously operable spectrum analyzer and RF power detector, and a transceiver for receiving instructions from and for transmitting information to the receiver module; and
the receiver module having a transceiver for transmitting instructions to and receiving data from the RF power detector sensor module, the spectrum analyzer sensor module, the RF interference and noise filtering sensor module and the dual function sensor module.

2. The system of claim 1 wherein the RF power detector sensor module senses RMS, log, and peak RF power in accordance with received instructions.

3. The system of claim 1 wherein the transceiver in the spectrum analyzer sensor module is also for transmitting spectral analyses of the RF input to a receiver of the transceiver of the RF interference and noise filtering sensor module, the RF interference and noise filtering sensor module, the RF interference and noise filtering sensor module being configured to transmit an interference cancelling signal responsive to the spectral analysis.

4. An RF monitoring and diagnostic system comprising:
- a receiver module having a wireless transceiver for transmitting instructions to at least one RF sensor module and for receiving conditioned and sampled signals from the at least one RF sensor module, the receiver module further having a processor coupled to the wireless transceiver for processing the conditioned and sampled signals and uploading the processed signals onto a network; and
- the at least one RF sensor module selected from one or more of the following:
  - a RF spectrum analyzer sensor module having a signal conditioning circuit for conditioning an RF signal, a sampling circuit for sampling the conditioned RF signal, an external memory element for storage of the sampled RF signal, a processor for packetizing the stored RF signals, and a wireless transceiver for receiving instructions from the receiver module and transmitting the stored RF signals to the receiver module,
  - a RF power detector sensor module having an RF detector for sensing RF power, a sampling circuit to sample the sensed RF power, an external memory element to store the sampled RF power, a processor for packetizing the stored RF power, and a wireless transceiver for receiving instructions from the receiver module and transmitting the stored RF power samples to the receiver module,
  - a RF interference and noise filtering module having a wireless transceiver for receiving interference filtering instructions from and sending success and failure responses to the receiver module, a synthesizer for synthesizing and actualizing at least one interference cancelling RF signal, a processor to manage a reference block, and a transmitter for transmitting the interference cancelling RF signal; and
  - a dual function sensor module having a spectrum analyzer path comprising a signal conditioning circuit for conditioning a RF signal and a sampling circuit for sampling the conditioned RF signal, a RF power detector path comprising an RF detector for sensing RF power and a sampling circuit to sample the sensed RF power, a RF switch for enabling either the spectrum analyzer path or the RF power detector path, a processor for packetizing sampled RF signal and RF power, and a wireless transceiver for receiving instructions from the receiver module and transmitting the sampled RF signals and RF power to the receiver module.

5. The system of claim 4 wherein the at least one RF sensor module comprises first and second RF power detector sensor modules, the first and second RF power detector sensor modules having different dynamic range, frequency of operation and input power capabilities.

6. The system of claim 4 wherein the at least one RF sensor module comprises first and second spectrum analyzer sensor modules, the first and second spectrum analyzer sensor modules having different sensing bandwidths.

7. The system of claim 4 wherein the at least one RF sensor module comprises the RF power detector sensor module and the RF spectrum analyzer module.

8. The system of claim 4 wherein the at least one RF sensor module comprises at least one RF spectrum analyzer sensor module.

9. The system of claim 4 wherein the at least one RF sensor module comprises at least one RF power sensor module.

10. The system of claim 4 wherein the at least one RF sensor module comprises a first RF sensor module comprising the dual function sensor module, a second RF sensor module comprising the RF power detector sensor module, and a third RF sensor comprising the RF interference and noise filtering sensor module.

11. The system of claim 4 wherein the at least one RF sensor module comprises a first RF sensor module comprising the dual function sensor module, a second RF sensor module comprising the RF interference and noise filtering sensor module, and a third RF sensor module comprising the spectrum analyzer sensor module.

12. The system of claim 4 wherein the at least one RF sensor module comprises first and second RF sensor modules comprising dual function sensor modules, the two dual function sensor modules differing in frequency of operation, bandwidth, dynamic range, and input power capacity, spectrum analyzer functions on each dual sensor modules differing by bandwidth; and a third RF sensor module comprising the RF interference and noise filtering sensor module.

13. The system of claim 4 wherein the at least one RF sensor module comprises a first RF sensor module comprising the RF spectrum analyzer sensor module and a second RF sensor module comprising the RF interference and noise filtering sensor module.

14. The system of claim 4 wherein the at least one RF sensor module comprises a first RF sensor module comprising the dual function sensor module and a second RF sensor module comprising the RF interference and noise filtering sensor module.

15. The system of claim 4 wherein the at least one RF sensor module comprises a first RF sensor module comprising the dual function sensor module and a second RF sensor module comprising the RF power detector sensor module.

16. The system of claim 4 wherein the at least one RF sensor module comprises a first RF sensor module comprising the dual function sensor module and a second RF sensor module comprising the RF spectrum analyzer sensor module.

17. The system of claim 4 wherein the at least one RF sensor module comprises first, second, third and fourth RF sensor modules, and wherein the first RF sensor module comprises the spectrum analyzer sensor module, the second RF sensor module comprises the RF power detector sensor module, the third RF sensor module comprises the dual function sensor module, and the fourth RF sensor module comprises the RF interference and noise filtering sensor module.

18. The system of claim 4 wherein the at least one RF sensor module comprises first, second, third and fourth RF sensor modules, and wherein the first, second and third RF sensor modules each comprise the RF power detector sensor module and the fourth RF sensor module comprises the RF spectrum analyzer sensor module.

19. The system of claim 4 further comprising wherein the at least one RF sensor module comprises first, second, third and fourth RF sensor modules, and wherein the first RF sensor module comprises a spectrum analyzer sensor module and the second, third and fourth RF sensor modules comprise RF interference and noise filtering sensor modules.

20. The system of claim 4 further comprising wherein the at least one RF sensor module comprises first, second, third and fourth RF sensor modules, and wherein the first RF sensor module comprises an RF interference and noise filtering sensor module and the second, third and fourth RF sensor modules comprise dual function sensor modules.

* * * * *